United States Patent [19]

Iwasawa

[11] Patent Number: 4,949,313

[45] Date of Patent: Aug. 14, 1990

[54] ULTRASONIC DIAGNOSTIC APPARATUS AND PULSE COMPRESSION APPARATUS FOR USE THEREIN

[75] Inventor: Hiroshi Iwasawa, Hachioji, Japan

[73] Assignee: Olympus Optical Co., Ltd., Tokyo, Japan

[21] Appl. No.: 339,112

[22] Filed: Apr. 17, 1989

[30] Foreign Application Priority Data

Apr. 20, 1988 [JP] Japan .................................. 63-95438
Jan. 18, 1989 [JP] Japan .................................. 1-17721

[51] Int. Cl.$^5$ ............................................. G03B 42/06
[52] U.S. Cl. ..................................... 367/7; 128/660.01
[58] Field of Search .................... 367/7, 11, 100, 101, 367/102, 105, 13; 73/626, 1 DV; 128/660.01

[56] References Cited

U.S. PATENT DOCUMENTS

| | | | |
|---|---|---|---|
| 3,886,490 | 5/1975 | Green ........................................ | 367/7 |
| 4,090,169 | 5/1978 | Adair et al. ............................. | 367/13 |
| 4,425,634 | 1/1984 | Iino et al. .............................. | 367/105 |
| 4,449,209 | 5/1984 | Zehner et al. ......................... | 367/102 |
| 4,716,414 | 12/1987 | Luttrell et al. .......................... | 367/7 |

FOREIGN PATENT DOCUMENTS 58-73345  5/1983  Japan .
63-233369 9/1988  Japan .

Primary Examiner—Thomas H. Tarcza
Assistant Examiner—Daniel T. Pihulic
Attorney, Agent, or Firm—Stevens, Davis, Miller & Mosher

[57] ABSTRACT

In a pulse compression apparatus for use in an ultrasonic diagnostic apparatus in which an ultrasonic chirp pulse whose frequency is increased or decreased in time is emitted toward a body under inspection, an ultrasonic wave reflected by the body is received to generate an echo signal, a correlation between the echo signal and a reference wave is derived to compress the echo signal, and an ultrasonic image is formed in accordance with the compressed echo signal, the reference wave is formed by processing an echo signal reflected from a reference body having a known acoustic property or an ultrasonic wave permeable window of a cap which surrounds an ultrasonic vibrating element, and the thus formed reference wave is stored in a memory. When the ultrasonic image of the body under inspection is displayed, the echo signal reflected from the body is pulse-compressed by deriving a correlation between the reference wave and the echo signal, and the thus compressed echo signal is used to display the ultrasonic image.

22 Claims, 4 Drawing Sheets

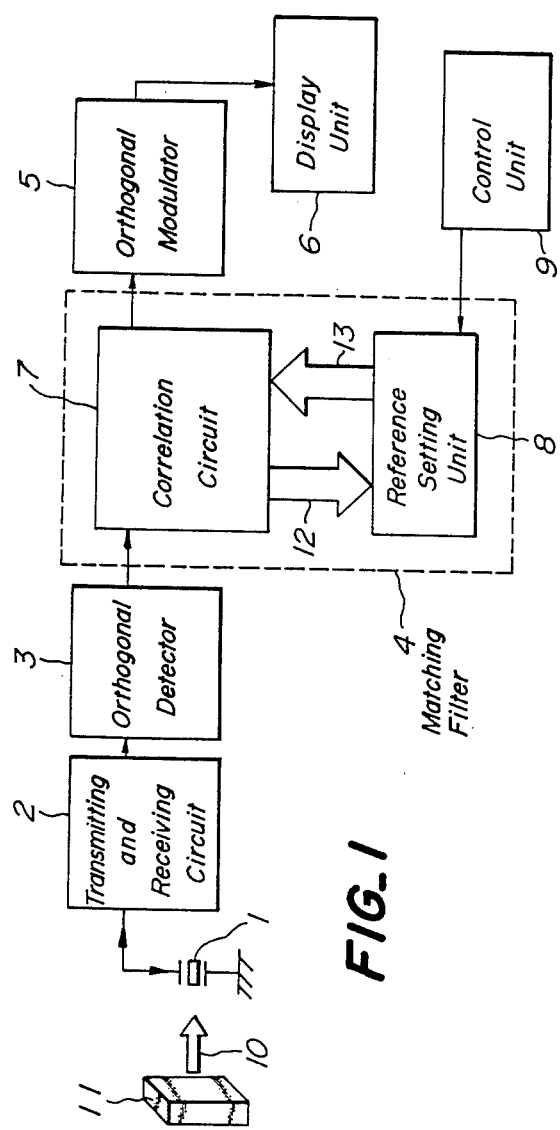
FIG._1
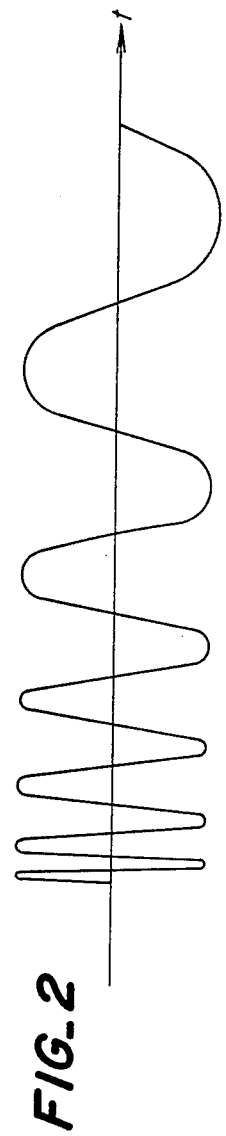
FIG._2

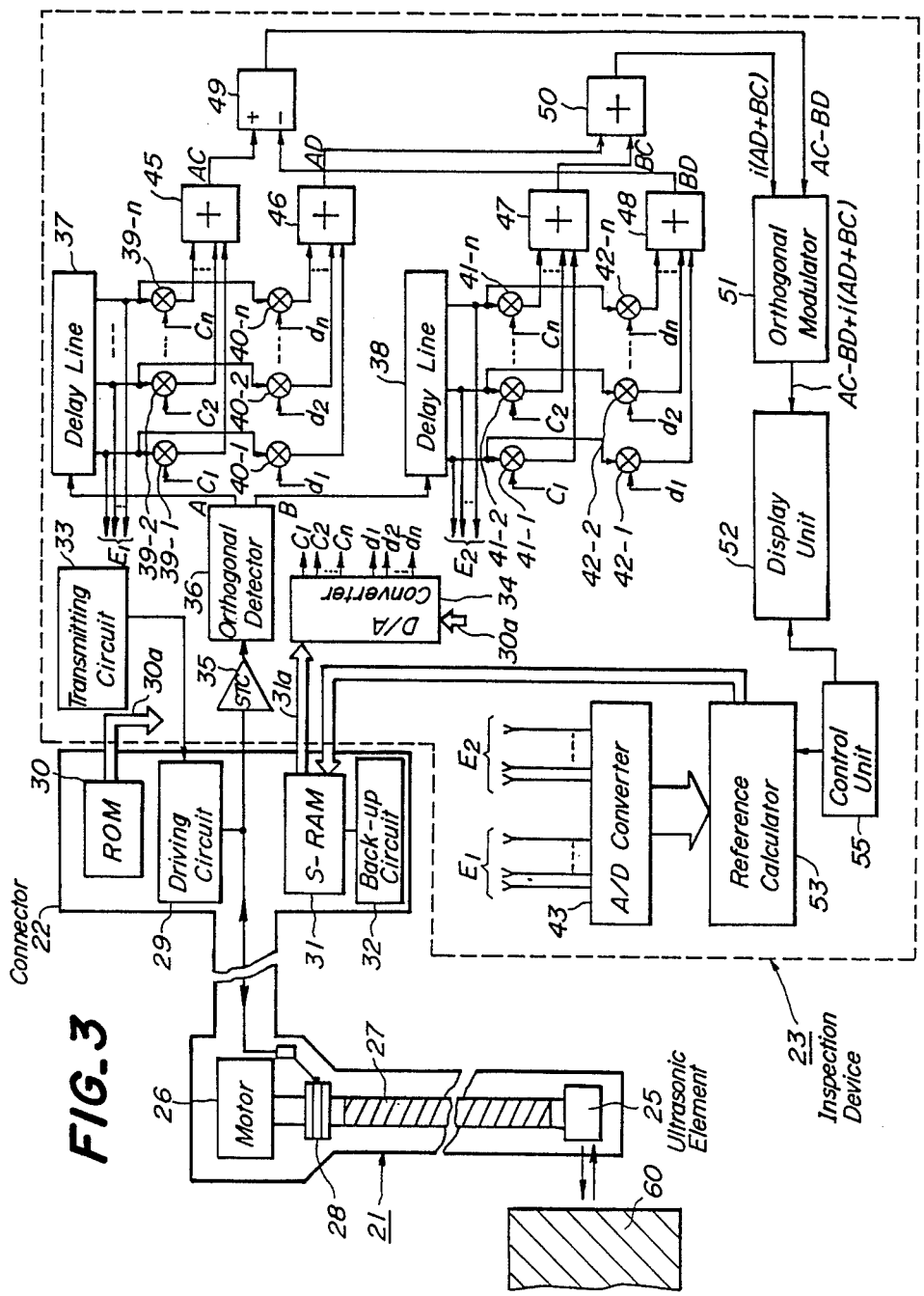

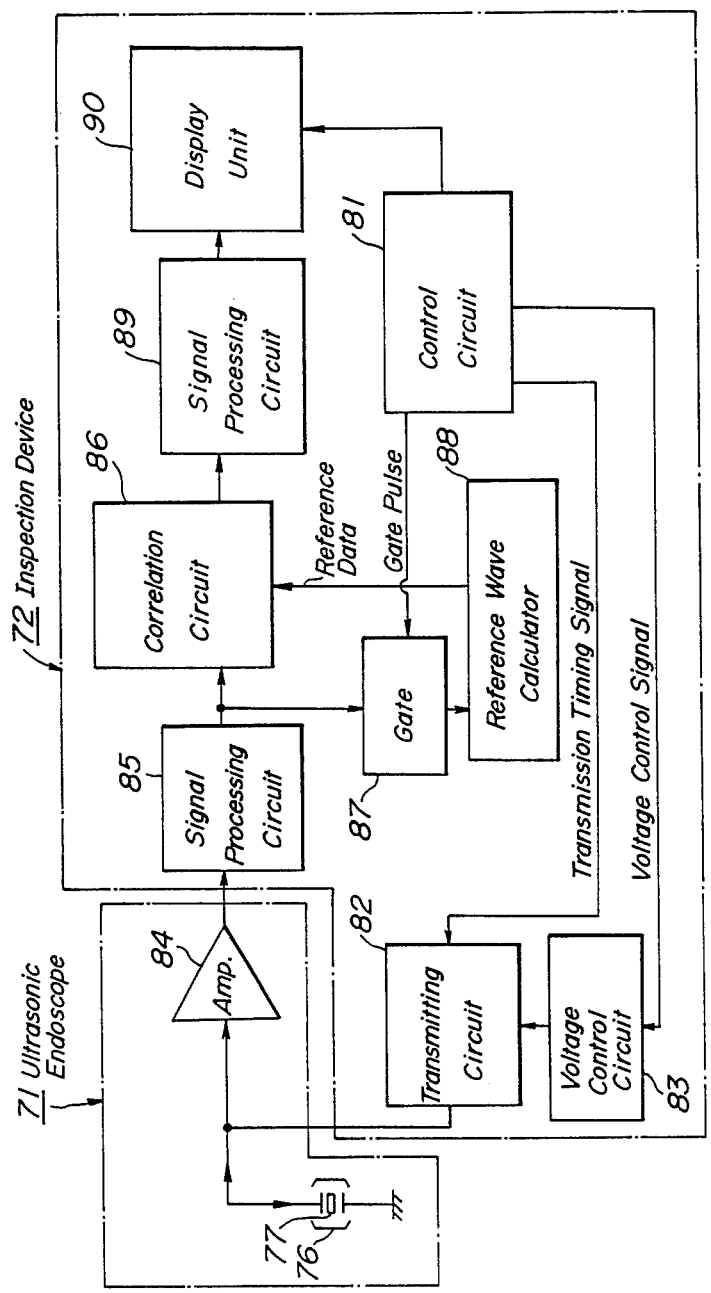
FIG._4

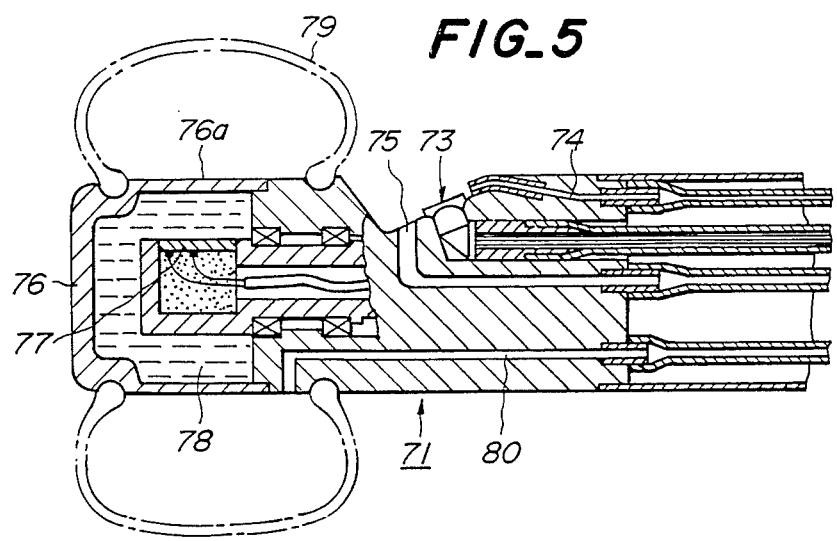
FIG_5
FIG_6A
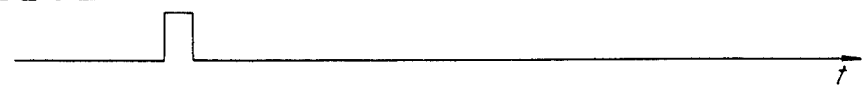
FIG_6B
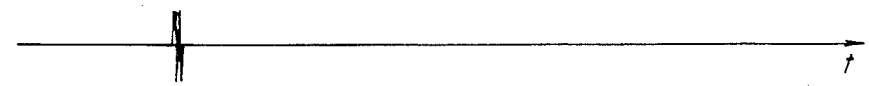
FIG_6C

ULTRASONIC DIAGNOSTIC APPARATUS AND PULSE COMPRESSION APPARATUS FOR USE THEREIN

BACKGROUND OF THE INVENTION

Field of the Invention and Related Art Statement

The present invention relates to an ultrasonic diagnostic apparatus for diagnosing characteristics of a specimen such as a living body by using an ultrasonic wave, and a pulse compression apparatus for use therein.

Heretofore, there has been proposed in, for instance Japanese Patent Application Publication Kokai Sho No. 58-73,345, an ultrasonic diagnostic apparatus using the pulse compression method which has been utilized in the pulse radar. In this known ultrasonic diagnostic apparatus, there are merits that the detectable range can be made long and the distance resolution can be increased, but has the following demerits mainly due to the fact that a special SAW (Surface Acoustic Wave) filter is used as a matching filter for effecting the pulse compression.

That is to say, since the ultrasonic diagnostic apparatus uses the low frequency and a wide frequency range, it is rather difficult to design the SAW filter satisfying such requirements. Further, in the ultrasonic diagnostic apparatus, in case of inspecting the living body having a large damping effect with the aid of the pulse reflection method, the filter characteristics have to be modified in the dynamic mode in accordance with the range from which the reflected echo is returned. However, in the SAW filter the filter characteristics are fixed by the pitch and length of the electrodes, so that it is practically impossible to obtain the SAW filter having the dynamic filter characteristics.

In order to remove the above problem, the applicant has proposed, in Japanese Patent Application Publication No. 63-233,369 (corresponding to U.S. patent application No. 107,497 now U.S. Pat. No. 4,788,981), the pulse compression apparatus for use in the ultrasonic diagnostic apparatus in which the echo signal is compressed by deriving the correlation with the aid of a correlation circuit by effecting the convolution-integrating in the time domain between the echo signal waveform and an impulse response waveform (reference wave). In this pulse compression apparatus for the ultrasonic diagnosis, since the SAW filter is not used and thus the pulse compression is carried out by deriving the correlation between the echo signal and the reference wave, the pulse compression is effected without being affected by the frequency and range, and thus the dynamic filter characteristics can be realized. Therefore, it is possible to realize the ultrasonic diagnostic apparatus having the high resolution and sensitivity.

The inventor has conducted various experiments and has found that the pulse compression apparatus disclosed in the above mentioned Japanese Patent Application Publication No. 63-233,369 has the following drawback.

In this ultrasonic diagnostic apparatus, reference wave data for the pulse compression has been set on the basis of an impulse signal actually received by the ultrasonic vibrating element and passed through a matching filter and has been stored in a memory circuit. The reference wave signal is derived by reading the reference wave data out of the memory circuit. Therefore, the previously set and stored reference signal data becomes not optimum due to the secular variation of the ultrasonic vibrating element and various circuit elements. This results in the decrease in the quality of ultrasonic image. In other words, in the above mentioned ultrasonic diagnostic apparatus, it is rather difficult to adjust or change the reference wave signal.

In case of effecting the ultrasonic diagnosis, it is usual to prepare a plurality of ultrasonic vibrating elements having different frequency characteristics and any desired ultrasonic vibrating element is selectively used. In this case, there have to be prepared a plurality of reference wave signals each corresponding to respective elements, and these reference wave signals are stored in the memory circuit. In such a case, it is further cumbersome to preset or change a plurality of reference wave signals.

SUMMARY OF THE INVENTION

The present invention has for its object to provide a novel and useful ultrasonic diagnostic apparatus which can avoid the above mentioned drawback and the pulse compression can be carried out always optimally by changing or correcting the reference wave signal in accordance with the secular variation of the ultrasonic vibrating element and other circuit elements, so that the ultrasonic image of high quality can be displayed.

It is another object of the invention to provide a pulse compression apparatus for use in the above mentioned ultrasonic diagnostic apparatus.

According to the invention, an ultrasonic diagnostic apparatus comprises transmitting means for transmitting toward a body under inspection an ultrasonic chirp wave whose frequency is varied in accordance with time;

receiving means for receiving an ultrasonic wave reflected from the body under inspection to generate an echo signal;

a reference wave forming means for forming a reference wave on the basis of an echo signal generated by said receiving means;

a correlation means for deriving a correlation between said reference wave formed by said reference wave forming means and the echo signal from the body under inspection to generate a pulse-compressed echo signal; and a display means for displaying an ultrasonic image of the body under inspection in accordance with said pulse-compressed echo signal generated from said correlation means.

BRIEF DESCRIPTION OF THE DRAWINGS

FIG. 1 is a schematic view showing a first embodiment of the ultrasonic diagnostic apparatus according to the invention;

FIG. 2 is a waveform of a chirp signal;

FIG. 3 is a block diagram depicting the detailed construction of the apparatus shown in FIG. 1;

FIG. 4 is a block diagram illustrating a second embodiment of the ultrasonic diagnostic apparatus according to the invention;

FIG. 5 is a cross sectional view showing the construction of the distal end of the ultrasonic endoscope; and FIGS. 6A to 6C are signal waveforms for explaining the operation of the second embodiment.

DESCRIPTION OF THE PREFERRED EMBODIMENTS

FIG. 1 is a schematic view showing the principal construction of the first embodiment of the ultrasonic diagnostic apparatus according to the invention. The apparatus comprises ultrasonic vibrating element 1, transmitting and receiving circuit 2, orthogonal detector circuit 3, matching filter 4, orthogonal modulating circuit 5 and display unit 6. The matching filter 4 includes correlation circuit 7 and reference wave setting unit 8 which is controlled by a control unit 9.

In the present embodiment, the ultrasonic vibrating element 1 is driven by the transmitting and receiving circuit 2 to transmit an ultrasonic chirp signal whose frequency is changed in accordance with a time t as illustrated in FIG. 2. In this embodiment, the frequency of the chirp signal is decreased in time. According to the invention, the frequency of the chirp signal may be increased in time. According to the invention, an ultrasonic wave 10 reflected by a reference body 11 is received by the element 1 and is converted into an echo signal. The echo signal is supplied via the transmitting and receiving circuit 2 to the orthogonal detector circuit 3 and is converted into a complex signal. The thus converted complex signal is supplied to the matching filter 4.

In the matching filer 4, in order to derive the correlation between the echo signal and the reference wave signal, the convolution-integration is carried out. Prior to the convolution-integration, the echo signal is supplied to the reference wave setting unit 8 as a reference wave calculating data 12. Then, in the reference wave setting unit 8, a reference wave is calculated on the basis of the reference wave calculating data 12. The calculated reference wave is supplied to the correlation circuit 7 as a reference wave setting data 13.

The above explained reference wave calculating and setting operation is controlled by the control unit 9. In the correlation circuit 7, the correlation between the thus determined reference wave signal and an echo signal actually reflected from the body under inspection is derived. In this manner, the echo signal from the body under inspection can be pulse-compressed, and the pulse-compressed echo signal is supplied via the orthogonal modulation circuit 5 to the display unit 6 to display an ultrasonic image.

According to the present embodiment, the reference wave can be automatically changed or corrected at will by operating the control unit 9, and the reference wave can be calibrated in accordance with the secular variation of the ultrasonic vibrating element and various circuit elements.

FIG. 3 shows the detailed construction of the first embodiment of the ultrasonic diagnostic apparatus according to the invention. In this embodiment, the apparatus is constructed as the ultrasonic endoscope apparatus. An ultrasonic endoscope 21 is detachably secured to an inspection device 23 by means of a connector 22. In a distal end of the endoscope 21 there is provided an ultrasonic vibrating element 25 which is rotated by a motor 26 via a flexible shaft 27. Signal wires (not shown) connected to the ultrasonic vibrating element 25 are extended within the flexible shaft 27 and are connected to slip rings 28 by means of which the signal may be supplied to and from the ultrasonic vibrating element 25.

In the connector 22, there are provided a driving circuit 29 for the ultrasonic vibrating element 25, a ROM 30 for storing an initial reference wave data, an S-RAM 31 for storing the reference wave data calculated by the inspection device 23 and a back-up circuit 32 for the S-RAM 31. A transmission rate signal generated from a transmitting circuit 33 provided in the inspection device 23 is supplied to the ultrasonic vibrating element driving circuit 29, and the reference wave data (30a, 31a stored in the ROM 30 and S-RAM 31 is supplied to a D/A converter 34 provided in the inspection device 23 and is converted into a reference wave signal (C+iD).

An echo signal received by the ultrasonic vibrating element 25 is supplied to an orthogonal detector circuit 36 by means of an STC (Sensitivity Time Control) circuit 35 and is converted into a complex signal (A+iB). Real and imaginary parts A and B of the complex signal are supplied to delay lines 37 and 38, respectively, and are sampled at taps provided on the delay lines. The sampled outputs $E_1$ and $E_2$ appearing at the taps on the delay lines 37 and 38, respectively are applied to one inputs of multipliers 39-1~39-n; 40-1~42-n and 41-1~41-n; 42-1~42-n, respectively as well as to an A/D converter 43. To the other inputs of the multipliers 39-1~39-n, 40-1~40-n and 41-1~41-n, 42-1~42-n, are applied real and imaginary parts of the reference signal supplied from the D/A converter 34. Output signals from the multipliers 39-1~39-n, 40-1~40-n, 41-1~41-n and 42-1~42-n are applied to adders 45, 46, 47 and 48, respectively. Output signals from the adders 45 and 48 are applied to a subtracter 49 and output signals from the adders 46 and 47 are applied to an adder 50. Output signals from the subtracter 49 and adder 50 are supplied to an orthogonal modulating circuit 51 and are processed thereby. Then, the processed signal is supplied to a display unit 52 and is displayed thereon as an ultrasonic image. It should be noted that the delay lines 37, 38, multipliers 39-1~39-n, 40-1~40-n, 41-1~41-n, 42-1~42-n, adders 45 48, 50 and subtracter 49 constitute the correlation circuit.

An output signal of the A/D converter 43 is supplied to a reference wave calculating circuit 53 and an output of this calculating circuit 53 is supplied to the S-RAM 31 provided in the connector 22 for the ultrasonic endoscope 21. The reference wave calculating circuit 53 and display unit 52 are controlled by a control unit 55. The control unit 55 also selects one of the ROM 30 and S-RAM 31 and the initial reference wave data or calculated reference wave data stored in the selected memory is read out and is supplied to the D/A converter 34.

Now, the operation of the apparatus shown in FIG. 3 will be explained more in detail.

In the present embodiment, during the usual inspection, the initial reference wave data 30a stored in the ROM 30 is used to effect the pulse compression for the echo signal reflected from the body to be inspected. At first, the chirp signal is generated from the ultrasonic vibrating element driving circuit 29 in accordance with the transmission rate signal supplied from the transmitting circuit 33, and the thus generated chirp signal is supplied via the slip rings 28 to the ultrasonic vibrating element 25. Then, the element 25 emits the ultrasonic chirp pulse as shown in FIG. 2, and an ultrasonic wave reflected from the body is received by the element 25 and is converted into an echo signal. The echo signal is supplied to the STC circuit 35 in which the decay of the ultrasonic wave in the body is compensated in accordance with the depth. The compensated echo signal is supplied to the orthogonal detecting circuit 36 and is converted into a complex signal (A+iB) of a low frequency band which is suitable for being processed by the subsequent circuits. Real part A and imaginary part B of the complex signal are supplied to the delay lines 37 and 38, respectively and there are obtained sampled signals $E_1$ and $E_2$ at the taps on the delay lines 37 and 38. The output signals $E_1$ appearing at the taps on the first delay line 37 are supplied to one inputs of the multipliers 39-1~39-n and 40-1~40-n, and the output signals $E_2$ at the taps on the second delay line 38 are supplied to one inputs of the multipliers 41-1~41-n and 42-1~42-n.

The control unit 55 controls the ROM 30 to read out the initial reference wave data 30a stored therein. The read out initial reference wave data 30a is supplied to the D/A converter 34 to derive the initial reference signal (C+iD; C; $C_1$~$C_n$, D; $d_1$~$d_n$). The output signals $C_1$~$C_n$ are applied to the other inputs of the multipliers 39-1~39-n and 41-1~41-n, and the output signals $d_1$~$d_n$ are supplied to the other inputs of the multipliers 40-1~40-n and 42-1~42-n. In this manner, in each multipliers, the echo signal is multiplied with the initial reference wave signal in the time domain. Then, a total sum (AC) of the outputs of the multipliers 39-1~39-11~39-n is derived by the adder 45, a total sum (AD) of outputs of the multipliers 40-1~40-n is obtained by the adder 46, a total sum (BC) of outputs from the multipliers 41-1~41-n is formed by the adder 47 and a total sum of outputs of the multipliers 42-1~42-n is derived by the adder 48. Further, a difference (AC−BD) between the outputs of the adders 465 and 48 is produced by the subtracter 49 and a sum (AD+BC) of outputs of the adders 46 and 47 is derived by the adder 50. In this manner, the echo signal converted into the complex signal (A+iB) is convolution-integrated with the reference wave signal (C+iD) to derive the correlation, and the pulse-compression can be effected. The compressed echo signal generated from the correlation circuit is supplied to the orthogonal modulating circuit 51 and is converted into the frequency band which can be easily handled by the display unit 52.

When the initial reference wave data 30a stored in the ROM 30 becomes not optimum due to the secular variation of the ultrasonic vibrating element and various circuit elements, the reference wave can be readjusted in the manner explained hereinbelow.

A reference body 60 having the reflective coefficient of almost 1, said reference body being made of, for instance stainless steel block is arranged in opposition to the ultrasonic vibrating element 25, and the ultrasonic chirp pulse is projected to the reference body 60. An ultrasonic wave reflected by the reference body 60 is received by the ultrasonic vibrating element 25 and is converted into an echo signal, which is then supplied to the correlation circuit via the STC circuit 35 and orthogonal modulating circuit 36. The control unit 55 controls the reference wave calculating circuit 55 such that a reference wave is calculated on the basis of outputs ($E_1$, $E_2$) from the delay lines 37 and 38. The thus calculated reference wave data is stored in the S-RAM 31 under the control of the control unit 55, said S-RAM being backed-up by the back-up circuit 32. During the usual inspection, the latest reference wave data 31a stored in the S-RAM 31 is read out and supplied to the multipliers 39-1~39-1~39-n, 40-1~40-n, 41-1~41-n and 42-1~42-n. In this manner, it is always possible to effect the correct pulse-compression by using the optimum reference wave which can be changed or corrected with the aid of the reference body 60 having the reflective coefficient of about 1.

FIG. 4 is a block diagram showing the second embodiment of the ultrasonic diagnostic apparatus according to the invention. An ultrasonic endoscope 71 is detachably secured to an inspection device 72 like as the previous embodiment. The ultrasonic endoscope 71 comprises an inoperating optical system 73, an air and water supply tube 74, a forceps channel 75, illumination optical system (not shown), and so on, and an ultrasonic vibrating element 77 is arranged rotatably in a distal end of the endoscope as illustrated in FIG. 5. The ultrasonic vibrating element 77 is protected by a cap 76 and is rotated by a motor not shown. Within the cap 76 is filled with an ultrasonic wave propagating medium 78 such as water. Then, an ultrasonic wave emitted from the element 77 is transmitted toward a body to be inspected by means of the medium 78 and cap 76. There is further provided a balloon 79 surrounding the cap and a duct 80 is formed in the endoscope for introducing and discharging the ultrasonic wave propagating medium into and out of the balloon 79.

The cap 76 includes an ultrasonic wave transmitting window 76a which is made of a material permeable to the ultrasonic wave and has a thin thickness. However, a part of the ultrasonic wave emitted from the ultrasonic vibrating element 77 is reflected by the window 76a and is further reflected by the element 77 and so on, so that the ultrasonic wave is multi-reflected between the element 77 and the window 76a. Therefore, from the ultrasonic vibrating element 77 there is produced a multiple echo signal. That is to say, when the ultrasonic wave is transmitted from the ultrasonic vibrating element 77 and reflected echoes are received by the element 77, there are produced, in addition to an echo from the body, a multiple echo signal as depicted in FIG. 6A.

In the present embodiment, one of the multiple reflected echoes is selected to derive or calculate the reference wave data.

In FIG. 4, the ultrasonic vibrating element 77 is driven by the chirp signal supplied from a transmitting circuit 82 in synchronism with the transmission timing signal from a control circuit 81 provided in the inspection device 72, and then the ultrasonic vibrating element 77 emits the ultrasonic chirp pulse as shown in FIG. 2. To the transmitting circuit 82 is connected a voltage control circuit 83 which is controlled by a voltage control signal from the control circuit 81. When a switch provided on an operational panel of the inspection device 72 is operated manually, the transmission power of the chirp signal sent from the transmitting circuit 82 to the ultrasonic vibrating element 77 is controlled via the voltage control circuit 83.

The echo signal supplied from the ultrasonic vibrating element 77 is amplified by a pre-amplifier 84 and is processed by a signal processing circuit 85. An output signal from the processing circuit 85 is supplied to a correlation circuit 86 as well as to a gate circuit 87. To the gate circuit 87 is supplied a gate pulse shown in FIG. 6B in the reference wave calculation mode so that a single echo signal shown in FIG. 6C is gated out of the multiple echo signals illustrated in FIG. 6A. The gated out echo is supplied to a reference wave calculating circuit 88. In the reference wave calculating circuit 88, a reference wave data is calculated on the basis of the gated out echo signal. The reference wave data thus calculated is supplied to a correlation circuit 86. During the ultrasonic image display mode, the correlation between the echo signal supplied from the signal processing circuit 85 and the reference wave data to pulse-compress an echo signal reflected from the body under inoperation. It should be noted that the calculated reference wave data may be stored in RAM provided in the reference wave calculating circuit 88 or correlation circuit 86. An output signal from the correlation circuit 86 is supplied to a signal processing circuit 89 and is converted into a frequency band which is easily processed by a display unit 90.

Now, the operation of the present embodiment will be explained.

In the present embodiment, prior to the ultrasonic image display mode, the reference wave data is derived on the basis of the echo signal obtained by the ultrasonic wave reflected from the cap 76 for protecting the ultrasonic vibrating element 77. In the reference wave calculation mode, the switch on the panel is adjusted to control or decrease the transmission power of the chirp signal sent from the transmitting circuit 82 with the aid of the voltage control signal via the voltage control circuit 83 such that the amplitude of the multiple echo signal is not saturated in the pre-amplifier 84 and signal processing circuit 85. In this manner, the ultrasonic chirp pulse having the low energy is emitted from the ultrasonic vibrating element 77 and the multiple echo received by the element is supplied to the gate circuit 87 via the pre-amplifier 84 and signal processing circuit 85 to gate out a desired echo signal in the multiple echo signals. The gated out echo signal is supplied to the reference wave calculating circuit 88, and the calculated reference wave data is stored in RAM provided in the reference wave calculating circuit 88 or correlation circuit 86.

During the ultrasonic image display mode, the switch on the panel is changed into the display mode, and the ultrasonic chirp pulse having the sufficient energy is emitted from the ultrasonic vibrating element 77. The echo signal is supplied to the correlation circuit 86 via the pre-amplifier 84 and signal processing circuit 85 to derive the correlation of the echo signal with the previously calculated reference wave data to effect the pulse compression. The compressed signal is supplied by means of the signal processing circuit 89 to the display unit 90 to display the ultrasonic image of the body.

When the previously calculated reference wave data becomes not optimum for the accurate pulse-compression due to the secular variation of the ultrasonic vibrating element and other circuit elements, the switch on the panel is switched again into the calculation mode and new reference wave data is calculated on the basis of the echo reflected from the protection cap 76 in the same manner as that explained above.

In the present embodiment, since the calibration of the reference wave data is effected by using the protection cap 76 which is inherently provided on the ultrasonic endoscope for protecting the ultrasonic vibrating element, it is no more necessary to prepare the special reference body and the calibration can be conducted very easily.

The present invention is not limited to the embodiments explained above, but many modifications and alternations may be conceived by those skilled in the art within the scope of the invention. For instance, the present invention may be applied not only to the ultrasonic endoscope, but also to the ultrasonic diagnostic apparatus used in the exterior of the body. Further, in the first embodiment, the previously determined initial reference wave data is stored in ROM 30, but the initial reference wave data may be calculated in the manner explained above and the calculated data may be stored in S-RAM 31. In this case, it is possible to omit ROM. Moreover, in the second embodiment, the transmission power of the chirp signal transmitted from the transmitting circuit 82 is controlled such that the amplitude of the multiple echo is adjusted or lowered to such a level which is suitable for calculating the reference wave data, but it is also possible to fix the transmission power and to control the timing of the gate pulse such that a sufficiently decayed echo in the multiple echo can be gated out.

As explained above in detail, according to the instant invention, the reference wave data is calculated on the basis of the ultrasonic echo reflected from the predetermined body whose ultrasonic characteristics have been known, and the reference wave can be adjusted or corrected easily in accordance with the secular variation of the ultrasonic vibrating element and other circuit elements. Thus, the echo signal can be optimally pulse-compressed with the aid of the corrected reference wave. Further, in the first embodiment, since the reference wave calculated by the reference wave data calculating means is stored in the memory provided in the ultrasonic endoscope, the variation in the characteristics between respective ultrasonic vibrating elements can be easily corrected. Further, in case of using any one of a plurality of ultrasonic probes detachably secured to the single common inspection device, it is no more necessary to store the reference waves each corresponding to respective ultrasonic probes, and thus the construction of the whole system can be made simple.

What is claimed is:

1. An ultrasonic diagnostic apparatus comprising
   transmitting means for transmitting toward a body under inspection an ultrasonic chirp wave whose frequency is varied in accordance with time;
   receiving means for receiving an ultrasonic wave reflected from the body under inspection to generate an echo signal;
   a reference wave forming means for forming a reference wave in accordance with an echo signal generated by said receiving means;
   a correlation means for deriving a correlation between said reference wave formed by said reference wave forming means and the echo signal from the body under inspection to generate a pulse-compressed echo signal; and
   a display means for displaying an ultrasonic image of the body under inspection in accordance with said pulse-compressed echo signal generated from said correlation means.

2. An apparatus according to claim 1, wherein said reference wave forming means is constructed such that the reference wave is formed by processing an echo signal which is supplied from said receiving means when an ultrasonic chirp pulse is emitted from the transmitting means toward a predetermined body.

3. An apparatus according to claim 2, wherein said predetermined body is formed by a reference body having a known acoustic property.

4. An apparatus according to claim 3, wherein said reference body having the known acoustic property is formed by a stainless steel block.

5. An apparatus according to claim 1, wherein said transmitting means and receiving means comprise a common ultrasonic vibrating element.

6. An apparatus according to claim 5, wherein said apparatus further comprises
an ultrasonic probe having a flexible insertion section insertable into the body under inspection, a bending section arranged at a distal end of the insertion section and a distal end section connected to said bending section and having the ultrasonic vibrating element installed therein; and
an inspection device to which said ultrasonic probe is detachably secured and which includes said reference wave forming means, correlation means and display means.

7. An apparatus according to claim 6, wherein said ultrasonic probe comprises a first memory means for storing a previously determined initial reference wave corresponding to the ultrasonic vibrating element provided in the ultrasonic probe, and a second memory means for storing the reference wave formed by said reference wave forming means.

8. An apparatus according to claim 7, wherein said ultrasonic probe further comprises a back-up circuit for said second memory means.

9. An apparatus according to claim 6, wherein said predetermined body is formed by a cap provided at the distal end section to surround the ultrasonic vibrating element, said cap being made of an ultrasonic wave permeable material.

10. An apparatus according to claim 9, wherein said reference wave forming means comprises an orthogonal detection circuit for orthogonally detecting the echo signal from the predetermined body to generate real and imaginary signals, first and second delay lines for delaying said real and imaginary signals, respectively, each delay line having a plurality of taps, an analog-to-digital converter for converting output signals appearing at said taps on the first and second delay lines into digital signals, and a calculation circuit for calculating the reference wave by processing the digital signals supplied from said analog-to-digital converter.

11. An apparatus according to claim 10, wherein said orthogonal detection circuit and first and second delay lines are commonly used by the reference wave forming means and the correlation means.

12. An apparatus according to claim 11, wherein said correlation means comprises a plurality of multipliers for deriving products between the output signals appearing at said taps on the first and second delay lines and the reference wave, a plurality of adders for deriving sums of output signals from said multipliers, a subtracter for deriving a difference between output signals from the adders, an adder for deriving a sum of output signals from the adders, and an orthogonal modulation circuit for effecting the orthogonal modulation in accordance with output signals from said subtracter and adder.

13. An apparatus according to claim 9, wherein said reference wave forming means comprises a control circuit for generating a gate pulse for extracting an echo signal among multiple echo signals between an ultrasonic wave permeable window of the cap and the ultrasonic vibrating element.

14. An apparatus according to claim 13, wherein said reference wave forming means a transmission control circuit which is controlled by said control circuit to decrease an amplitude of the chirp signal when the reference wave is formed.

15. A pulse compression apparatus for use in an ultrasonic diagnostic apparatus in which an ultrasonic chirp pulse having a frequency which is varied in accordance with time is emitted toward a body under inspection, an ultrasonic wave reflected from the body under inspection is received to generate an echo signal, the echo signal is pulse-compressed to generate a compressed echo signal by deriving a correlation between the echo signal and a reference wave, and an ultrasonic image of the body under inspection is displayed in accordance with the compressed echo signal, comprising
a reference wave forming means for forming the reference wave for the pulse-compression by processing an echo signal from a reference body having a known acoustic property;
a memory means for storing the reference wave formed by said reference wave forming means; and
a correlation means for deriving a correlation between said reference wave stored in said memory means and the echo signal from the body under inspection.

16. An apparatus according to claim 15, wherein said reference wave forming means forms the reference wave by processing an echo signal from the reference body having a reflective coefficient of about 1.

17. An apparatus according to claim 15, wherein said reference wave forming means forms the reference wave by processing an echo signal reflected from an ultrasonic wave permeable window provided on the ultrasonic diagnostic apparatus, said ultrasonic wave permeable window serving as said reference body.

18. An apparatus according to claim 17, wherein said reference wave forming means is constructed such that an amplitude of the ultrasonic chirp wave is decreased when the reference wave is formed.

19. An apparatus according to claim 15, wherein said reference signal forming means comprises an orthogonal detection circuit for orthogonally detecting the echo signal from the predetermined body to generate real and imaginary signals, first and second delay lines for delaying said real and imaginary signals, respectively, each delay line having a plurality of taps, an analog-to-digital converter for converting output signals appearing at said taps on the first and second delay lines into digital signals, and a calculation circuit for calculating the reference wave by processing the digital signals supplied from said analog-to-digital converter.

20. An apparatus according to claim 15, wherein said orthogonal detecting circuit and first and second delay lines are commonly used by the reference wave forming means and the correlation means.

21. An apparatus according to claim 19 wherein said correlation means comprises a plurality of multipliers for deriving products between the output signals appearing at said taps on the first and second delay lines and the reference wave, a plurality of adders for deriving sums of output signals from said multipliers, a subtracter for deriving a difference between output signals from the adders, an adder for deriving a sum of output signals from the adders, and an orthogonal modulation circuit for effecting the orthogonal modulation in accordance with output signals from said subtracter and adder.

22. An apparatus according to claim 15, wherein the pulse compression apparatus further comprises a first memory means for storing an initial reference wave, and a second memory means for storing the reference wave which is formed when the ultrasonic diagnostic apparatus is used.

* * * * *